United States Patent
Ho

(10) Patent No.: US 7,395,973 B2
(45) Date of Patent: Jul. 8, 2008

(54) SMART CARD

(76) Inventor: Chun-Hsin Ho, 7F-1, No. 180, Sec. 2, Duen Hua South Rd., Taipei (TW) 106

( * ) Notice: Subject to any disclaimer, the term of this patent is extended or adjusted under 35 U.S.C. 154(b) by 449 days.

(21) Appl. No.: 11/296,309

(22) Filed: Dec. 8, 2005

(65) Prior Publication Data

US 2007/0131780 A1    Jun. 14, 2007

(51) Int. Cl.
*G06K 19/06*    (2006.01)
*G06K 5/00*    (2006.01)
(52) U.S. Cl. ........................... 235/492; 235/380
(58) Field of Classification Search ........... 235/380, 235/492; 713/172; 455/558
See application file for complete search history.

(56) References Cited

U.S. PATENT DOCUMENTS

| | | | |
|---|---|---|---|
| 7,227,449 B2 * | 6/2007 | Bonneau et al. | 340/10.41 |
| 2002/0130187 A1 * | 9/2002 | Berg et al. | 235/492 |
| 2002/0174337 A1 * | 11/2002 | Aihara | 713/172 |
| 2004/0030896 A1 * | 2/2004 | Sakamura et al. | 713/169 |
| 2004/0030898 A1 * | 2/2004 | Tsuria et al. | 713/171 |
| 2006/0043202 A1 * | 3/2006 | Kim et al. | 235/492 |
| 2006/0110958 A1 * | 5/2006 | Shen et al. | 439/135 |

* cited by examiner

*Primary Examiner*—Daniel A Hess
(74) *Attorney, Agent, or Firm*—Bacon & Thomas, PLLC.

(57) ABSTRACT

A smart card is disclosed and it includes a processor; a first interface for use in communication with a terminal; a second interface for use in communication with another smart card; and RST generation device for generating a RST signal for the another smart card.

14 Claims, 6 Drawing Sheets

SMART CARD

FIELD OF THE INVENTION

The present invention relates to a smart card, and more particularly, to a smart card in a dual card system for use with a terminal such as automatic teller machine (ATM) or point of sale (POS) card reader or with a communication terminal, i.e., a mobile phone.

BACKGROUND OF THE INVENTION

In the past, a magnetic card has been used as a bank card or credit card. In a magnetic card system, a personal identification data for identifying an owner of the magnetic card, which is known as a password, is stored in the magnetic card, and coincidence between the password electromagnetically read from the magnetic card loaded to a card reader and a password manually entered by the card owner is checked to determine whether the user of the card is a valid card owner. However, the following problems reside in the magnetic card.

Firstly, the password recorded on the magnetic card can be read by simple hardware and thus the use by an unauthorized person can be easily achieved.

Secondly, the password should be known only to the owner. However, the hardware for writing the password is necessary and a person who prepares the card is aware of the password.

Thirdly, security protection for an ATM or a credit card reader is not perfect and the prevention from leakage of the password is not perfect. Nevertheless, the password cannot be changed by the owner and the card is used even after another person has become acquainted with the password.

To overcome the above problems, U.S. Pat. No. 4,758,718, entitled "High Security IC Card with an Updateable Password" to Fujisaki et al., discloses an IC card having a microprocessor and a memory. In FIG. 1, numeral 10 denotes an IC card used as an identification medium for identifying a person, numeral 11 denotes a microprocessor for controlling registration and updating of a password data, numeral 12 denotes a communication interface for connection with a terminal device, numeral 13 denotes a keyboard for entering the password data, numeral 14 denotes a display device such as an LCD for displaying the password data, numeral 15 denotes a memory having areas for storing data necessary for registration and updating of the password, numeral 16 denotes a password memory area in the memory 15, the password area having 16 bits, numeral 17 denotes an area for storing the number of times of non-coincidence of the password in the memory 15, numeral 18 denotes an area for storing data representing a type and attributes of the IC card 10, and numeral 19 denotes a battery. The memory 15 has a password registration area in which the password is to be registered and a password update area in which updating data to update the password registered in the registration area is stored. The password is entered by a keying operation and the microprocessor controls the registration of the password and registers the password entered in the password registration area. When the registered password is to be changed, the number of times of input error for the password registered in the microprocessor is checked based on data preset in the password update area. If the number of times of error is smaller than a predetermined number, the registration area as well as the password update area is cleared and a newly entered password is permitted to be registered in the registration area.

Nowadays, IC cards or so-called "smart card" are used in numerous applications such as payment at a point of sale (known as "bank cards"), public telephones, payment for parking, payment for roll tolls, mobile telephones (e.g., SIM cards), health services, public transportation, or electronic purse. Each of these applications is associated with a specific card: a bank card, a phone card, a parking card, a SIM card for GSM telephony, and so on.

One of the problems encountered in daily use of such a variety of cards lies in that one of the cards might not be available when it is to be used, no matter whether it is left at home, its credit has been run out, or it has expired. In addition, administration and carry of various cards is inconvenient. Therefore, there is a strong need for the so-called "multi-application cards".

For example, U.S. Pat. No. 6,325,293, entitled "Method and System for Using a Microcircuit Card in a Plurality of Applications" to Moreno, discloses a microcircuit card including device activating a default application to be executed, device activating a target application to be executed, and switch device activating the card to be configured on command either as a default application card or as a target application card. FIG. 2 shows the organization and the general operating sequence of the method thereof.

As shown in FIG. 2, the subscription taken out by a client 20 from the radio telephone operator 21 operating the user's radio telephone 22 includes not only general radio telephone service, but also a special service, e.g. payment for parking, where the amount will be included as a specific item in the monthly listing of telephone consumption received from the operator 21 (billing represented by 23).

After parking a car close to an electronic "pay-and-display" parking meter machine 24 programmed to accept payment from prepaid cards issued by the city 25, the driver might find that no usable parking card is available or that the card is exhausted or invalid. To perform the payment required by the machine, the user then engages a "parking" command on the radio-telephone, e.g. by pressing on a button 26 or by selecting an option in a menu giving the optional services offered by the telephone operator. This command causes the SIM card 27 of the radio telephone to be "reconfigured" as a parking card. The user then extracts the card 27 from the radio telephone and inserts it (arrow 28) into the machine 24, which perceives the card as being a parking card, and the card is then operated and debited as such. The user then reinserts the card 27 (arrow 29) into the radio telephone 22 where it is read by the radio telephone which automatically reconfigures it for the GSM function.

Although such multi-application cards are technically feasible, in practice they are very difficult to implement, as demonstrated by numerous pioneering attempts ever since the invention of the IC card itself.

With the wide-spread usage of smart cards in mobile industry such as SIM for GSM, USIM for WCDMA, RUIM for CDMA2000 and PIM for PHS network, a large variety of applications have been developed by utilizing Smart cards resided in the mobile phone (SIM/USIM/RUIM/PIM, hereafter referred as UICC, Universal Integrated Circuit Card) to provide security services. Mobile operators ensure the security of the use of mobile service by authenticating the keys stored in the Smart cards that mobile operators issued to the subscribers. In addition, mobile operators provide also premium services like mobile banking, mobile stock trading service by storing keys provided by the banks or other service providers in the SIM cards. The keys are manipulated through an application interface developed by SIM Tool Kit (STK) which is also resided in the SIM card itself. When WAP (Wireless Application Protocol) phones were available, WIM (Wireless Identity Module) was also developed by the SIM card vendors to secure WAP security by storing certificate and PKI algorithm in the SIM itself (SWIM card) or another standalone WIM card which can be inserted into another card slot in the mobile phone.

The keypad and display screen of the mobile phone facilitate the inserted smart card with great user interface and the mobile nature of remote access to service providers further accomplishes the goal of service mobility. In order to achieve the service mobility, service providers like banks, credit card issuers, transportation card issuers, certificate issuers and stock brokers are eagerly to cooperate with the mobile operator to issue enhanced SIM cards so as to provide services which fall into their professions. However, the provisioning and management of the SIM capability and functionalities are in control of the mobile operators therefore it forms a closed system where only agreed parties are allowed to participate. Furthermore, the relationship between service providers and mobile operators are one of mutual distrust and both have similar agendas over control of security and payment methods. This becomes the main obstacle to the development of mobile security services.

In mobile telecommunication world, another emerging demand based on smart card is so-called "multiple SIM ownership" which indicates the trend of a single mobile phone user holding more than one SIM cards which may be issued by different mobile operators. The trend arises because of following reasons:

to have separate accounts for personal and business use
to have separate SIMs of mobile operators of different countries when traveling to save roaming fee charge
to keep separate SIMs for different service plans, such as daytime and off-peak calling
to keep separate SIMs for different promotion tariff packages to save cost A special mobile phone with dual chip or dual slot capability used to be introduced to resolve the above issues, by providing an additional chip slot on the mobile phone in order for the service provider or another mobile operator to issue its own smart card or SIM storing its own secret keys. However, the special phones are normally costly and not well-accepted by the user, thus forming a fragmented market place where service providers can play with.

Therefore, it needs to provide a smart card that can rectify those drawbacks of the prior art and solve the above problems.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In accordance with an aspect of the present invention, a smart card includes a processor; a first interface for use in communication with a terminal; a second interface for use in communication with another smart card; and RST generation means for generating a RST signal for another smart card.

Preferably, the processor further includes a buffer for receiving and saving an ATR (Answer To Reset) signal from the another smart card.

Preferably, the processor further includes ATR generation means for generating an ATR signal.

Preferably, the processor further includes PTS (Protocol Type Selection) request generation means for generating a PTS request signal for another smart card.

Preferably, the processor further includes PTS response generation means for generating a PTS response signal for the terminal.

Preferably, the processor further includes PTS determination means for determining whether the PTS request signal is acceptable by both the terminal and another smart card.

Preferably, the processor further includes a clock regulator for providing a clock frequency for another smart card.

More advantageously, the processor further includes command APDU (Application Protocol Data Unit) determination means for determining whether a command APDU signal issued from the terminal is associated with the smart card or another smart card.

More advantageously, the processor further includes command APDU generation means for generating a command APDU signal for another smart card.

More advantageously, the processor further includes a buffer for receiving and saving a response APDU signal from another smart card.

More advantageously, the processor further includes response APDU generation means for generating a response APDU signal for the terminal.

More advantageously, the smart card is provided with an antenna for communication with a contactless terminal.

More advantageously, the smart card comprises a SIM (Subscriber Identity Module) card, USIM (Universal Subscriber Identity Module) card, UIM (User Identity Module) card and RUIM (Removable User Identity Module) card.

More advantageously, the smart card comprises a credit card, debit card and ATM card.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention discloses a smart card in a dual card system and a method for using the same, and the objects and advantages of the present invention will become more readily apparent to those ordinarily skilled in the art after reviewing the following detailed description. The present invention needs not be limited to the following embodiments.

First Embodiment

Figure 1:
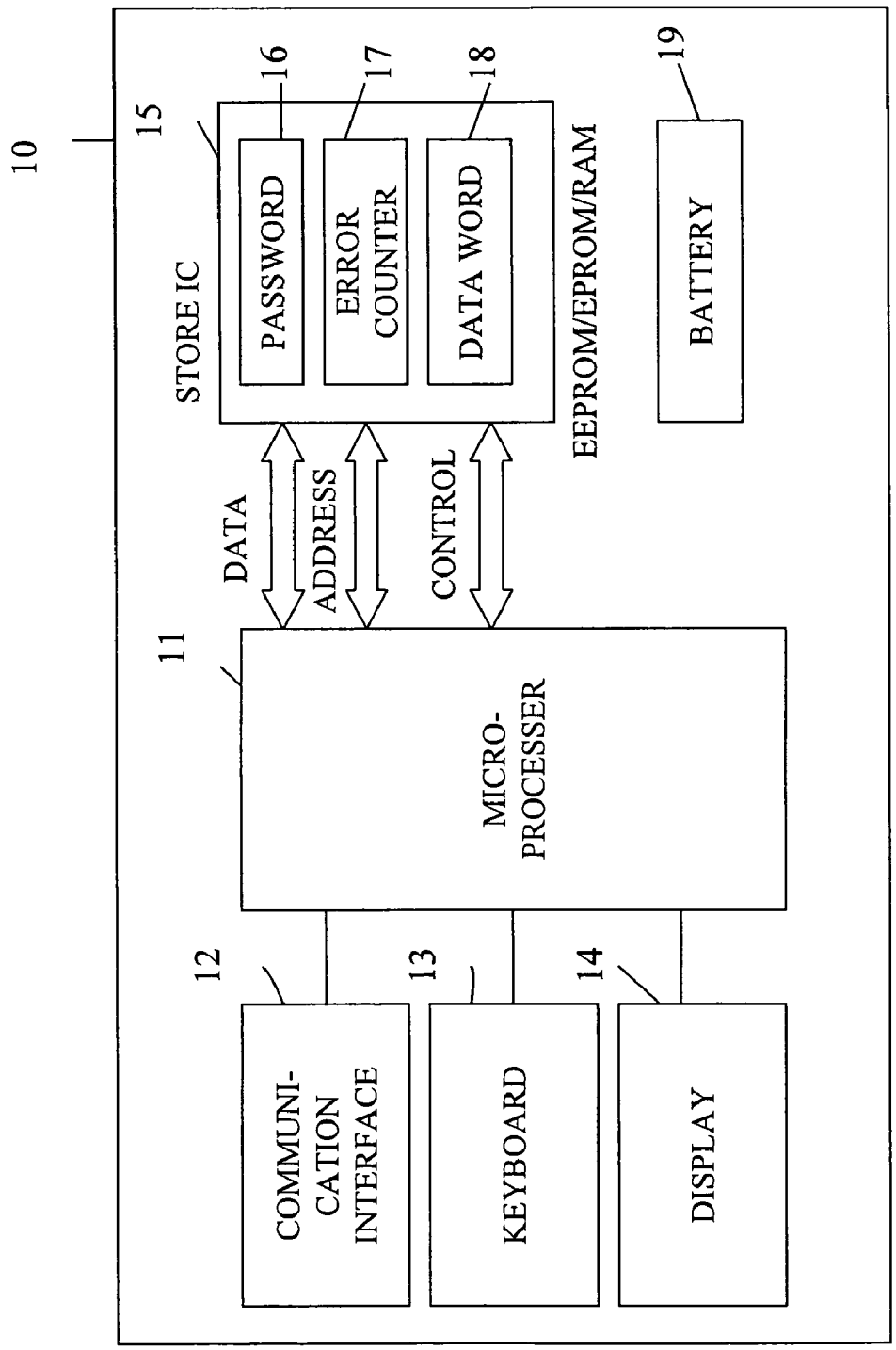
FIG. 1 is a block diagram showing a conventional IC card.
Figure 2:
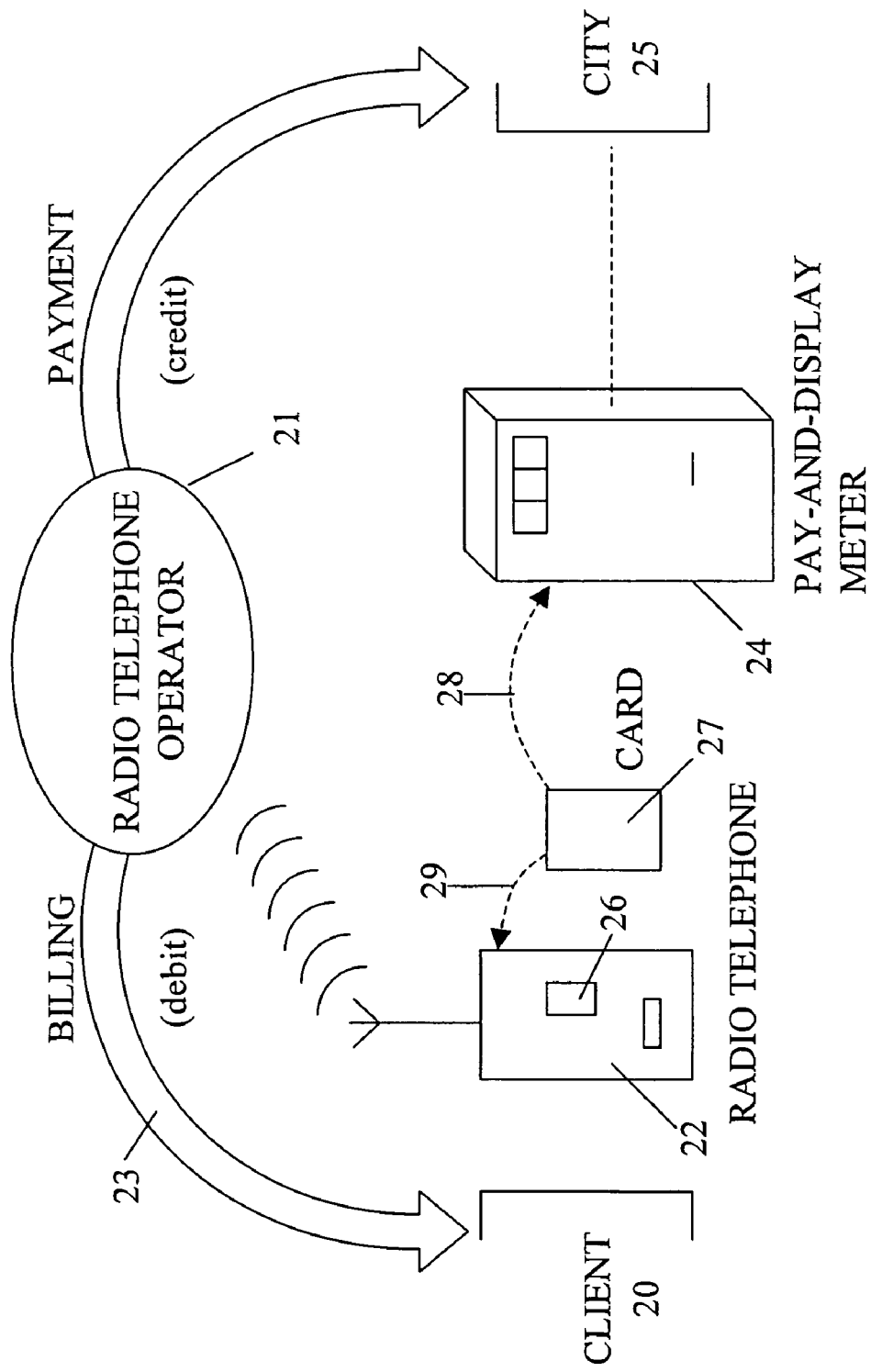
FIG. 2 is a diagram showing various device and players according to another conventional method.
Figure 3:
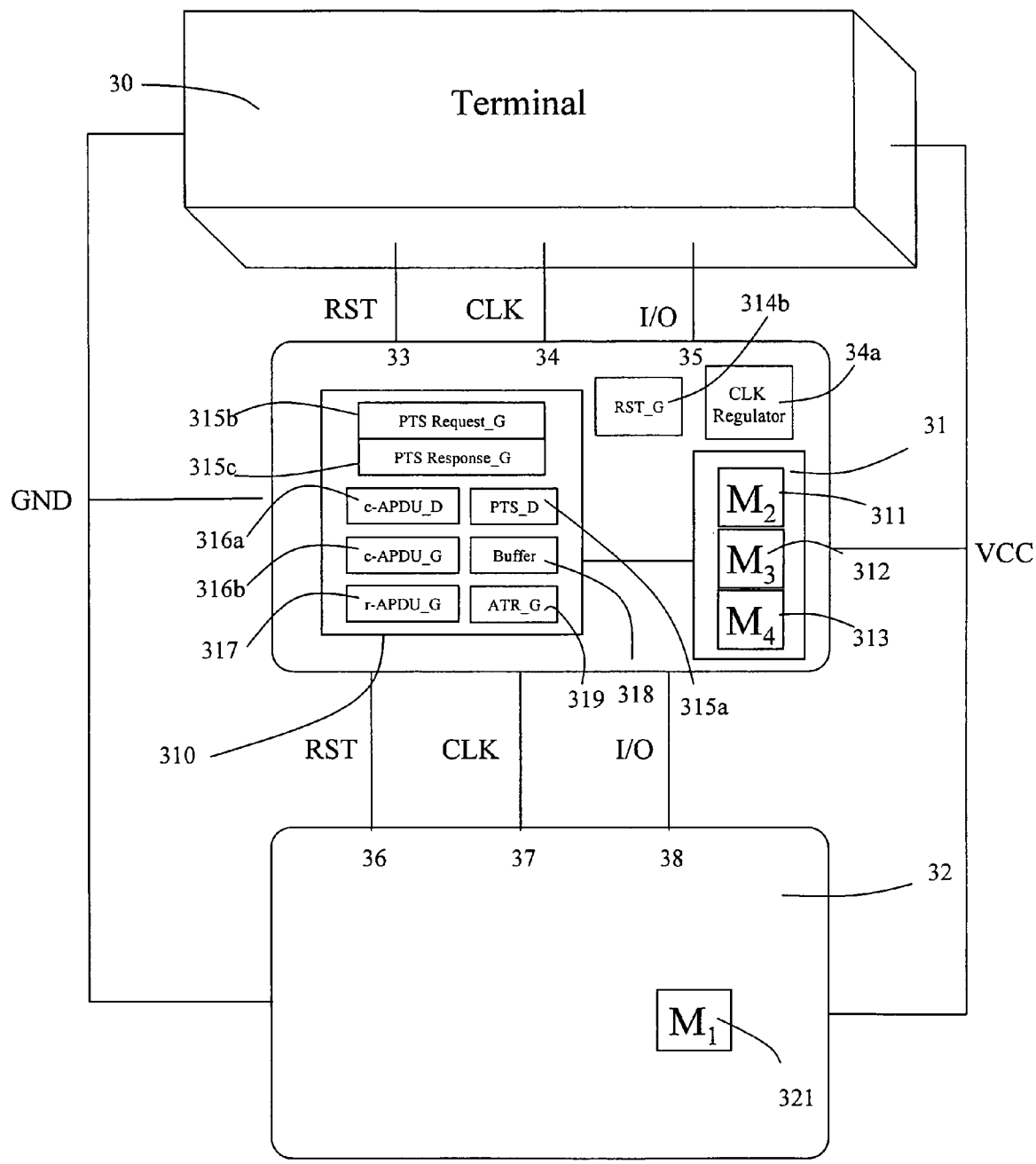
FIG. 3 is a block diagram of a first embodiment of a smart card in a dual card system for use with a transaction terminal according to the present invention.

Please refer to FIG. 3. It illustrates a block diagram of a first embodiment of a smart card in a dual card system for use with a transaction terminal according to the present invention. As shown in FIG. 3, the dual card system for use with the transaction terminal 30 consists of a first card 32 and a second card 31. The first card 32 has a first memory 321 for storing first identification information for use in a target transaction with a transaction terminal 30. The second card 31 includes a processor 310, a RST generation device 314b, a second memory 311, a third memory 312, a fourth memory 313, and a clock regulator 34a. The second memory 311 stores second identification information for use in a target transaction with the transaction terminal 30. The third memory 312 stores transaction related information. The fourth memory 313 stores first personal information that is not secured by the first card 32. The clock regulator 34a receives a clock signal from the transaction terminal 30 via CLK line 34 and provides another clock signal to the first card 32 via CLK line 37. The clock signal provided by the clock regulator 34a can be the same or different than that provided by the transaction terminal 30.

Meanwhile, the first card 32 is installed with a first operating system, and the second card 31 is installed with a second operating system. The second card 31 can play the roles of a smart card and a card reader simultaneously in order to control the first card 32.

The second card 31 is coupled to the transaction terminal 30 via three lines: RST line 33, CLK line 34, and I/O port 35, which lines are naturally in addition to a power supply line VCC and a ground line GND. Moreover, the transaction terminal 30 is a smart card reader of a portable device or an fixed terminal like ATM or POS. Furthermore, the first card 32 is coupled to the second card 31 via three lines: RST line 36, CLK line 37, and I/O port 38, as shown. Actually, the second card 31 is provided with two I/O ports, I/O port 35 and I/O port 38 to communicate with the transaction terminal 30 and the first card 32, respectively. Certainly, the second card 31 is able to cope with different communication protocols of the I/O port 35 and the I/O port 38. According to the first embodiment of the present invention, the second card 31 is also able to issue Application Protocol Data Unit (APDU) commands through the I/O port 38 to the first card 32, and the second card 31 provides clock signals to the first card 32 through CLK line 27. In other words, the second card 31 acts both as a smart card and a smart card reader in controlling the first card 32.

Generally, a smart card sends an ATR (Answer To Reset) via the I/O port to a card reader after a supply voltage VCC, a clock CLK, and a reset signal RST have been applied. The data string and data elements of the ATR are defined and described in detail in the ISO/IEC 7816-3 standard. The basic ATR format is shown in Table 1.

TABLE 1

The data elements of the ATR and their meanings, according to ISO/IEC 7816-3

| Data Element | Description |
| --- | --- |
| TS | Initial Character |
| T0 | Format Character |
| TA1, TB1, TC1, TD1, . . . | Interface Characters |
| T1, T2, . . . , TK | Historical Characters |
| TCK | Check Character |

The first two bytes, designated TS and T0, define various fundamental transfer parameters and the presence of subsequent bytes. The interface characters specify special transfer parameters for the protocol, which are important for the following data transfers. The historical characters describe the extent of the Smart Card's basic functions. The check character, which is a checksum of the previous bytes, may optionally be sent as the last byte of the ATR, depending on the transmission protocol. Moreover, this data string of ATR is always sent with a divider value and contains various data relevant to the transmission protocol and the card. As known, the smart card shows various data transfer parameters in the interface characters of ATR, such as the transmission protocol and the character waiting time.

Furthermore, if a terminal wants to modify one or more of these parameters, a Protocol Type Selection (PTS) must be performed before actual execution of the protocol. The terminal can use this to modify certain protocol parameters, as long as this is permitted by the card.

Figure 5A:
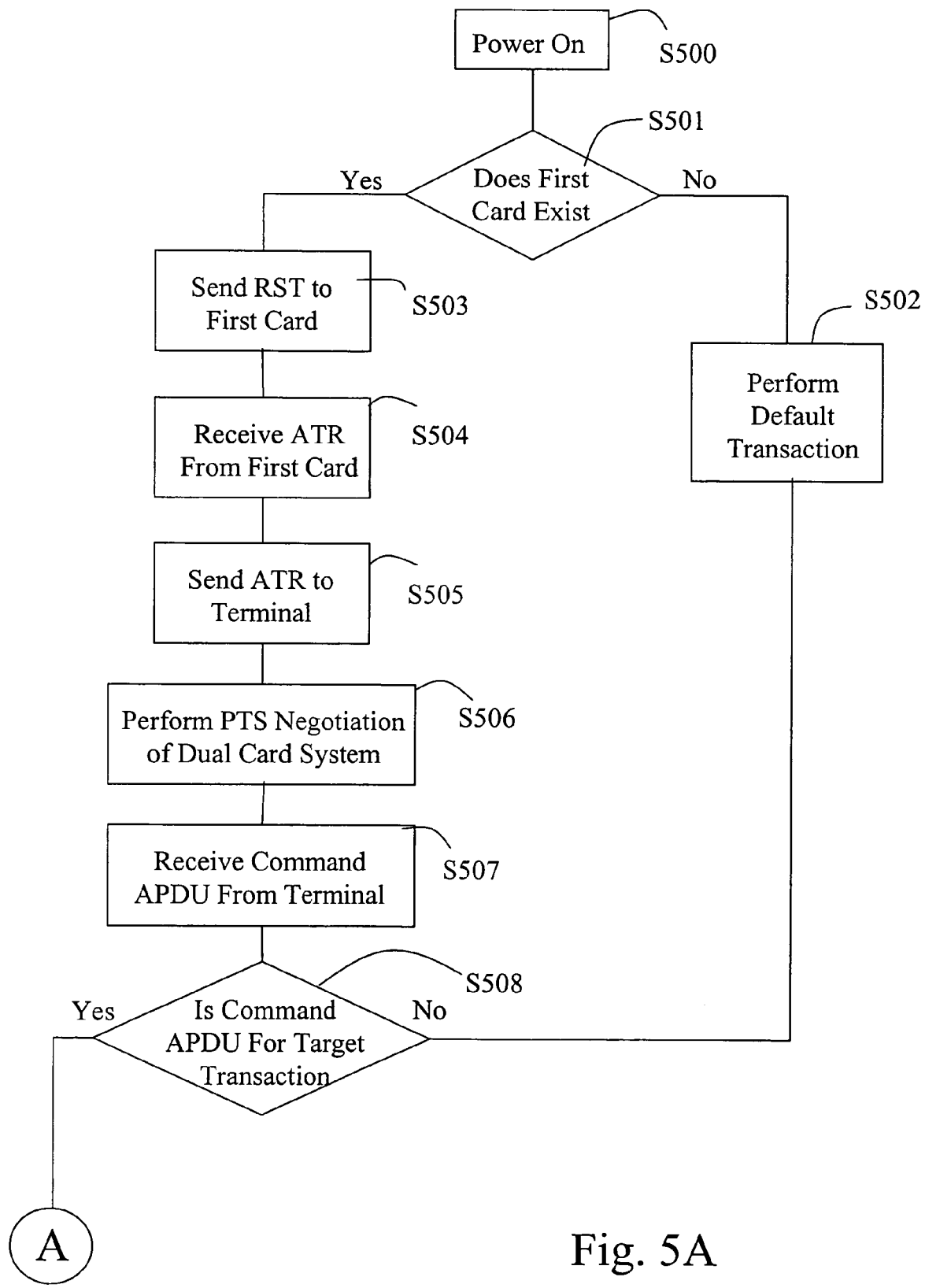
FIG. 5 is a flow chart showing a transaction method by use of a dual card system according to the present invention.
Figure 5B:
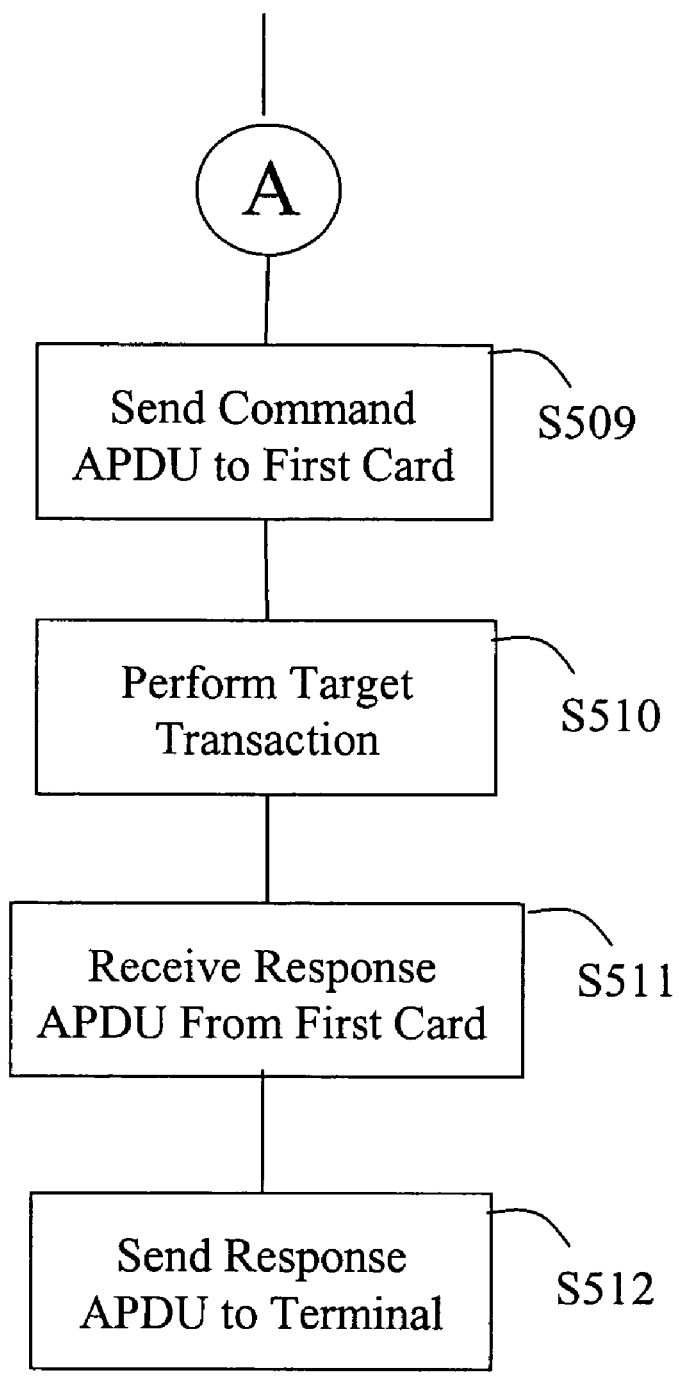

In the present invention, with reference to FIGS. 3 and 5, the processor 310 of the second card 31 includes a buffer 318, an ATR generation device 319, a PTS determination device 315a, a PTS request generation device 315b, a PTS response generation device 315c, a command APDU determination device 316a, a command APDU generation device 316b, and a response APDU generation device 317. In a transaction, a transaction terminal 30 determines whether a first card 32 exists after being powered on (step S500 and S501). If a first card 32 doesn't exist in a transaction system, then the transaction terminal 30 will perform a default transaction with the second card 31 (step S502). Moreover, the default transaction can also be a contactless communication with another terminal via an antenna provided in the second card 31. In this case, the communication is through a radio communication. On the other hand, if a first card 32 exists, then the transaction terminal 30 will perform in a dual card system. In a dual card system, signals that are to be sent to the first card 32 all go through the second card 31. In other words, the transaction terminal 30 doesn't communicate directly with the first card 32. That is, the second card 31 is a slave to the transaction terminal 30, but also a master to the first card 32. Therefore, reset signals (RST2) issued from the transaction terminal 30 is sent directly to the second card 31 only, no matter whether the transaction is related to the first card 32 or the second card 31. Once the second card receives RST2, then the RST generation device 314b will generate a reset signal (RST1) to the first card 32 (step S503). After receiving RST1, the first card 32 responses with an Answer-To-Reset signal (ATR1) to the buffer 318 (e.g. First-In First-Out (FIFO) buffer) of the second card 31 (step S504). After receiving ATR1 from the first card 32, the ATR generation device 319 of the second card 31 generates another Answer-To-Reset signal (ATR2') to the transaction terminal 30 (step S505).

Generally speaking, an Answer-To-Reset signal must occur between 400 and 40,000 clock cycles after the transaction terminal 30 issues a reset signal. With a clock rate of 3.5712 MHz, this corresponds to an interval of 112 µs to 11.20 ms, while at 4.9152 MHz the interval is 81.38 µs to 8.14 ms. If the transaction terminal 30 does not receive the ATR within this interval, it repeats the activation sequence several times (usually up to three times) to try to detect an ATR. If all these attempts fail, the terminal assumes that the card is faulty and responds accordingly. However, if ATR1 is sent to the second card 31 after the second card 31 receives RST2 from the transaction terminal 30, as mentioned above, then it would be difficult for ATR1 to respond within time. Therefore, to overcome this problem, the RST generation device 314b of the second card 31 is programmed to spontaneously generate a reset signal (RST1) to the first card 32 once the second card 31 is powered on regardless of reception of RST2 from the transaction terminal 30. That is to say, the RST generation device 314b doesn't necessary wait until RST2 is sent from the transaction terminal 30 before sending RST1 to the first card 32 to avoid delayed response to the transaction terminal 30. Hence, the second card 31 preserves the ATR1 sent from the first card 32 in buffer 318 until RST2 is received. By this way, ATR1 can be sent immediately after RST2 is issued.

After the transaction terminal 30 receives an ATR signal from the ATR generation device 319, the terminal then continuously sends a PTS (Protocol Type Selection) request signal (PTS1) to the second card 31 to perform PTS negotiation (step S506). Then, the PTS request generation device 315b of the second card 31 will generate a PTS request signal (PTS2) to the first card 32. In response to PTS2, the first card 32 sends a PTS response signal (PTS3) back to the second card 31. Accordingly, the PTS determination device 315a of the second card 31 determines whether the protocol indicated by the first PTS request signal issued from the transaction terminal 30 is able to be performed by both the first card 32 and the second card 31 according to PTS3 sent from the first card 31. Next, the PTS response generation device 315c of the second card 31 will send another PTS response signal (PTS4) to the transaction terminal 30. This sequence will continue until the indicated protocol of the transaction terminal 30 is accepted between the transaction terminal 30 and the second card 31, and between the second card 31 and the first card 32.

Once an indicated protocol is found, the transaction terminal 30 will send a command APDU signal (c-APDU1) to the command APDU determination device 316a of the second card 31 (step S507) requesting for a transaction. After receiving c-APDU1, the command APDU determination device 316a determines whether the c-APDU1 requests for a default transaction or a target transaction (step S508). If the c-APDU1 issued from the transaction terminal 30 requests for a target transaction, the command APDU generation device 316b of the second card 31 will generate a command APDU signal (c-APDU2) to the first card 32 (step S509), and then perform target transaction (step S510). The first card 32 will send a response APDU (r-APDU1) to the buffer 318 of the second card 31 after target transaction is performed (step S511). After receiving r-APDU1 from the first card 32, the response APDU generation device 317 of the second card 32 then generates another response APDU signal (r-APDU2) to the transaction terminal 30 indicating target transaction is finalized (step S512).

In this embodiment of the present invention, the transaction related information is rewritten by the processor 310 when a transaction request issued from the first card is approved by the transaction terminal 30 based on the first or second identification information. For example, the transaction related information may be a balance for a debit card value, and the processor 310 can increase/decrease the balance when the transaction is performed.

Furthermore, the second card 31 can detect the existence of the first card 32 by calculating the responding time of ATR1 from the first card 32 when the dual card system is inserted in a transaction terminal; alternatively, the second card 31 can provide a user interface such as SIM Application Tool Kit menu of the SIM card for the user to configure the presence of the first card if the dual card system is inserted in a mobile phone.

For example, a POS (Point Of Sales) card, which stores values, is regarded as the second card 31 of the present invention, and an ATM card, which stores a bank account, is regarded as the first card 32. Both of them have original functions. In the present invention, the POS card can be regarded as a master card, which is also a card reader and able to read the ATM card in a transaction terminal. Thus, a user can remit money from the bank account stored in the ATM card to the electronic purse of the POS card via the transaction terminal according to the present invention. In the case of dual card system in a mobile phone, the SIM card is regarded as the second card, and a POS card is regarded as the first card of the present invention, a user can reload money to the electronic purse of the POS card by a mobile terminated short message from the bank in response to a mobile originated short message from the user, in order to top-up the POS card. In this case, the cell phone is regarded as the terminal. Accordingly, the present invention provides a dual card system for use with two different transaction terminals for facilitating to transacting information in practice.

Second Embodiment

Figure 4:
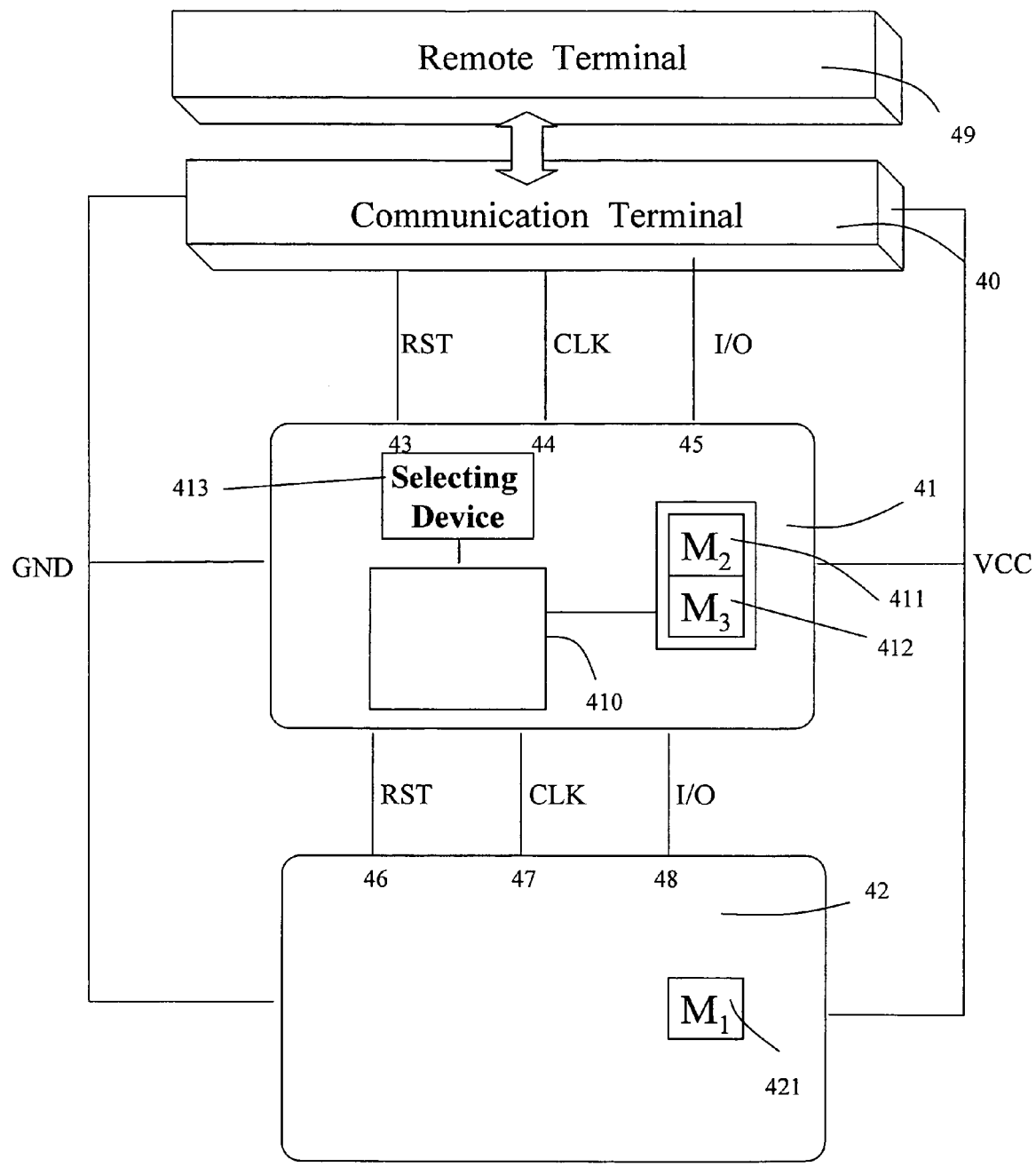
FIG. 4 is a block diagram of a second embodiment of a smart card in a dual card system for use with a communication terminal according to the present invention.

Please refer to FIG. 4. It illustrates a block diagram of a second embodiment of a smart card in a dual card system for use with a communication terminal according to the present invention. As shown in FIG. 4, the dual card system for use with the communication terminal 40 consists of a first card 42 and a second card 41. The first card 42 has a first memory 421 for storing first identification information which includes first personal information, first secret keys, and first security function for use in communication with a remote terminal 49 via the communication terminal 40. The second card 41 includes a processor 410, a second memory 411, a third memory 412, and a selecting device 413. The second memory 411 stores second identification information which includes second personal information, second secret keys, and second security function for use in communication with a remote terminal 49 via the communication terminal 40. The third memory 412 may store the first personal information which is not secured by the first card 32. The selecting device 413 is to determine one security function of the first card and the second card which is to be performed. The processor 410 effectuates or not the first card 42 based on whether the first card or the second card is selected by the selecting device 413.

In this embodiment, either of the first card 42 and the second card 41 could be a SIM (Subscriber Identity Module) card, USIM (Universal Subscriber Identity Module) card, UIM (User Identity Module) card and RUIM (Removable User Identity Module) card, which are used for different mobile communication systems. When two SIM cards are regarded as the first card 42 and the second card 41, respectively, the second SIM card could integrate both information of two SIM cards such as two phonebooks. The selecting device is normally presented by SIM Tool Kit menu which provides the user interface to select the SIM which is to be used to register to the mobile network. In practice, the dual card system is able to integrate two SIM cards into a communication terminal, i.e., mobile phone. According to the present invention, a mobile telecommunications company could provide the service to its user to integrate an old SIM card of another company with a new SIM card. The user could make a phone call with two different identification by selecting one of the two SIM cards at his own choice.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A smart card, comprising:
a processor;
a first interface for use in communication with a terminal;

a second interface for use in communication with another smart card; and

RST generation means for generating a RST signal for said another smart card.

2. The smart card according to claim 1, wherein said processor further includes a buffer for receiving and saving an ATR (Answer To Reset) signal from said another smart card.

3. The smart card according to claim 1, wherein said processor further includes ATR generation means for generating an ATR signal.

4. The smart card according to claim 1, wherein said processor further includes PTS (Protocol Type Selection) request generation means for generating a PTS request signal for said another smart card.

5. The smart card according to claim 4, wherein said processor further includes PTS determination means for determining whether said PTS request signal is acceptable by both said terminal and said another smart card.

6. The smart card according to claim 1, wherein said processor further includes PTS response generation means for generating a PTS response signal for said terminal.

7. The smart card according to claim 1, wherein said processor further includes a clock regulator for providing a clock frequency for said another smart card.

8. The smart card according to claim 1, wherein said processor further includes command APDU (Application Protocol Data Unit) determination means for determining whether a command APDU signal issued from said terminal is associated with said smart card or said another smart card.

9. The smart card according to claim 1, wherein said processor further includes command APDU generation means for generating a command APDU signal for said another smart card.

10. The smart card according to claim 1, wherein said processor further includes a buffer for receiving and saving a response APDU signal from said another smart card.

11. The smart card according to claim 1, wherein said processor further includes response APDU generation means for generating a response APDU signal for said terminal.

12. The smart card according to claim 1, wherein said smart card is provided with an antenna for communication with another terminal.

13. The smart card according to claim 1, wherein said smart card comprises a SIM (Subscriber Identity Module) card, USIM (Universal Subscriber Identity Module) card, UIM (User Identity Module) card and RUIM (Removable User Identity Module) card.

14. The smart card according to claim 1, wherein said smart card comprises a credit card, debit card and ATM card.

* * * * *